(12) United States Patent
Liu et al.

(10) Patent No.: US 10,094,962 B2
(45) Date of Patent: Oct. 9, 2018

(54) COLOR FILTER ARRAY SUBSTRATE, METHOD FOR FABRICATING THE SAME AND DISPLAY DEVICE

(71) Applicant: BOE TECHNOLOGY GROUP CO., LTD., Beijing (CN)

(72) Inventors: Chen Liu, Beijing (CN); Jinbo Lu, Beijing (CN); Xuelan Wang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 217 days.

(21) Appl. No.: 14/353,210

(22) PCT Filed: Jun. 28, 2013

(86) PCT No.: PCT/CN2013/078299
§ 371 (c)(1),
(2) Date: Apr. 21, 2014

(87) PCT Pub. No.: WO2014/139244
PCT Pub. Date: Sep. 18, 2014

(65) Prior Publication Data
US 2015/0253473 A1 Sep. 10, 2015

(30) Foreign Application Priority Data
Mar. 15, 2013 (CN) .......................... 2013 1 0084574

(51) Int. Cl.
*G02B 5/20* (2006.01)
*G02F 1/1335* (2006.01)
*G02B 5/08* (2006.01)

(52) U.S. Cl.
CPC .......... *G02B 5/201* (2013.01); *G02B 5/0808* (2013.01); *G02F 1/133512* (2013.01);
(Continued)

(58) Field of Classification Search
CPC ......... G02F 1/133509; G02F 1/133512; G02F 1/133553; G02F 1/1335; G02F 1/133514;
(Continued)

(56) References Cited

U.S. PATENT DOCUMENTS 5,629,783 A 5/1997 Kanbara et al.
6,879,359 B1 4/2005 Kikkawa et al.
(Continued)

FOREIGN PATENT DOCUMENTS

CN 1979295 A 6/2007
CN 202008538 U 10/2011

OTHER PUBLICATIONS

English tranlation of CN 202008538, machine translated on Feb. 2, 2016.*
(Continued)

*Primary Examiner* — Jie Lei
(74) *Attorney, Agent, or Firm* — Ladas & Parry LLP

(57) ABSTRACT

A color filter array substrate, a method for fabricating the same and a display device are provided. The color filter array substrate comprises an array substrate (310), and a black matrix (320), a color filter layer (341, 342, 343) and a reflection layer (330) formed on the array substrate (310); wherein the black matrix (320) comprising a plurality of openings defining sub-pixel regions; the color filter layer (341, 342, 343) and the reflection layer (330) are disposed in the plurality of openings and the reflection layer (330) is disposed on a side of the color filter layer (341, 342, 343) that is close to the array substrate (310).

20 Claims, 4 Drawing Sheets

(52) U.S. Cl.
CPC .. *G02F 1/133514* (2013.01); *G02F 1/133516* (2013.01); *G02F 1/133533* (2013.01); *G02F 1/133553* (2013.01); *G02F 2001/133519* (2013.01); *G02F 2001/133565* (2013.01)

(58) Field of Classification Search
CPC ......... G02F 1/133555; G02F 1/133345; G02F 1/33; G02F 1/29; G02F 1/116; G02F 1/1533; G02F 2001/133357; G02F 2001/133567; G02F 1/133533; G02F 1/133516; G02F 2001/133565; G02F 2001/133519; G02B 5/20; G02B 5/18; G02B 5/201; G02B 5/0808; G02B 26/008
USPC ....... 359/242, 267, 275, 308, 310, 316, 884, 359/891; 349/114, 106, 113, 122, 110, 349/104
See application file for complete search history.

(56) References Cited

U.S. PATENT DOCUMENTS

2006/0119771 A1* 6/2006 Lim .................. G02F 1/133555
349/114
2007/0126954 A1* 6/2007 Iijima ............... G02F 1/133514
349/113

OTHER PUBLICATIONS

International Preliminary Report on Patentability Appln. No. PCT/CN2013/078299; dated Sep. 15, 2015.

The State Intellectual Property Office of the People's Republic of China ("SIPO") (Chinese language) first office action dated Jan. 19, 2015 by SIPO in Chinese Patent Application 201310084574.7. Eight (8) pages.

English Translation of the State Intellectual Property Office of the People's Republic of China ("SIPO") first office action dated Jan. 19, 2015 by SIPO in Chinese Patent Application 201310084574.7. Eight (8) pages.

International Search Report for International Application No. PCT/CN2013/078299, 11pgs.

Second Chinese Office Action dated Jun. 16, 2015; Appln. No. 201310084574.7.

Third Chinese Office Action dated Nov. 25, 2015; Appln. No. 201310084574.7.

* cited by examiner

COLOR FILTER ARRAY SUBSTRATE, METHOD FOR FABRICATING THE SAME AND DISPLAY DEVICE

CROSS REFERENCE TO RELATED APPLICATIONS

This application is based on International Application No. PCT/CN2013/078299 filed on Jun. 28, 2013, which claims priority to Chinese National Application No. 201310084574.7 filed on Mar. 15, 2013. The entire contents of each and every foregoing application are incorporated herein by reference.

FIELD OF THE ART

Embodiments of the invention relate to the field of display technologies, more particularly, to a color filter array substrate, a method for fabricating the same and a display device.

BACKGROUND

Reflective display has a wide application prospect due to having the following advantages: no harm on eyes, no need for a backlight module, stable display, energy saving and environment friendly.

FIG. 1 is a schematic configuration of a conventional reflective liquid crystal panel. As illustrated in FIG. 1, the reflective liquid crystal panel comprises a first display substrate and a second display substrate disposed opposed to each other and a liquid crystal layer 150 filled between the two display substrates. Herein the first display substrate comprises a first transparent substrate 110, a color filter layer, a black matrix 121, a flattened layer 130, and a common electrode layer 140. The first display substrate is generally referred to as a color filter substrate and configured for providing colors for the liquid crystal panel. The second display substrate comprises a second transparent substrate 180, on which a plurality of Thin Film Transistors (TFTs) arranged as a matrix (not shown in the figure), a reflection layer 160, a pixel electrode layer 170 and signal lines (including a gate line and a data line and not illustrated in the figure) are formed. The second display substrate is generally referred to as an array substrate and configured for controlling rotation of the liquid crystals to achieve different grayscales. Herein, the color filter layer comprises a plurality of red color filters 122, green color filters 123 and blue color filters 124 disposed in opening regions of the black matrix 121. The pixel electrode layer 170 comprises a plurality of pixel electrodes, which are disposed in correspondence with projection regions of the red color filters 122, the green color filters 123 and the blue color filters 124.

When the reflective liquid crystal panel operates, ambient light sequentially passes through the color filter layer, the flattened layer 130 and the common electrode layer 140 after entering a side of the first transparent substrate 110, and then it is incident on the liquid crystal layer 150. At this time, the pixel electrodes in the pixel electrode layer 170 generate a pixel voltage such that an electrical field is created between the pixel electrode layer 170 and the common electrode layer 140. Driven by the electrical field, the liquid crystal molecules in the liquid crystal layer start to rotate, thereby controlling the transmission of the externally-incident light through the liquid crystal layer. The liquid crystal layer 150 can therefore allow the light to pass or block the light.

When the liquid crystal layer 150 allows the ambient light to pass, the light will be incident on the reflection layer 160 and reflected by the reflection layer 160. The light reflected by the reflection layer 160 will sequentially pass through the liquid crystal layer 150, the common electrode layer 140, the flattened layer 130, the color filter layer and the first transparent substrate 110. Eventually, the light exits from the reflective liquid crystal panel and get color images displayed.

FIG. 2 is a reflected light path diagram of the conventional reflective liquid crystal panel. As illustrated in FIG. 2, light entering the left side of the display device exits from the right side after being reflected by the reflection layer illustrated in FIG. 1 and can not enter the frontal active display area. As a result, the light usage efficiency is relative low.

Meanwhile, the conventional liquid crystal panel has an extra reflection layer in comparison with a regular liquid crystal panel, which increases the thickness of the liquid crystal panel and thus can not meet the requirement of being thin and narrow for liquid crystal panels.

SUMMARY

An objective of the invention is to provide a color filter array substrate, a method for fabricating the same and a display device so as to reduce the thickness of the reflective liquid crystal panel and the thickness of the display device.

A first aspect of the invention provides a color filter array substrate, comprising an array substrate, and a black matrix, a color filter layer and a reflection layer formed on the array substrate; wherein, the black matrix comprises a plurality of openings defining sub-pixel regions;

the color filter layer and the reflection layer are disposed in the plurality of openings and the reflection layer is disposed on a side of the color filter layer that is close to the array substrate.

As an example, the surface of a middle portion of the reflection layer that faces the color filter layer is a flat surface, the surface of edge portion of the reflection layer that faces the color filter layer and is adjacent to the back matrix is an upwardly inclined surface.

As an example, an inclination angle between the inclined surface and the flat surface ranges from 30 degree to 45 degree.

As an example, a maximum thickness of the reflection layer is greater than a half of a maximum thickness of the color filter layer and smaller than the maximum thickness of the color filter layer.

As an example, a width of the flat surface of the reflection layer is ⅔ to ⅚ of a total width of the reflection layer.

As an example, the color filter array substrate further comprises a flattened layer formed on a side of the black matrix and the color filter layer that is far from the array substrate.

A second aspect of the invention provides a display device comprising the above color filter array substrate.

A third aspect of the invention provides a method for fabricating a color filter array substrate, comprising:

forming an array substrate;

forming a pattern of a black matrix on the array substrate, wherein the black matrix comprises a plurality of openings defining sub-pixel regions; and forming a pattern of a reflection layer and a pattern of a color filter layer disposed in the plurality of openings on the array substrate, the reflection layer is disposed on a side of the color filter layer that is close to the array substrate.

As an example, the step of forming a pattern of a black matrix on the array substrate, wherein the black matrix comprises a plurality of openings defining sub-pixel regions comprises:

forming a reflection layer film on the array substrate;

forming the pattern of the reflection layer by using a half-tone or a gray-tone mask through a patterning process, the surface of a middle portion of the reflection layer that faces the color filter layer is a flat surface, the surface of edge portion of the reflection layer that faces the color filter layer and is adjacent to the back matrix is an upwardly inclined surface.

As an example, the method further comprises:

forming a flattened layer on a side of the black matrix and the color filter layer that is far from the array substrate.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DETAILED DESCRIPTION

In order to make objects, technical details and advantages of the embodiments of the invention apparent, the technical solutions of the embodiment will be described in a clearly and fully understandable way in connection with the drawings related to the embodiments of the invention. It is obvious that the described embodiments are just a portion but not all of the embodiments of the invention. Based on the described embodiments herein, those skilled in the art can obtain other embodiment(s), without any inventive work, which should be within the scope of the invention.

Embodiment 1

Figure 1:
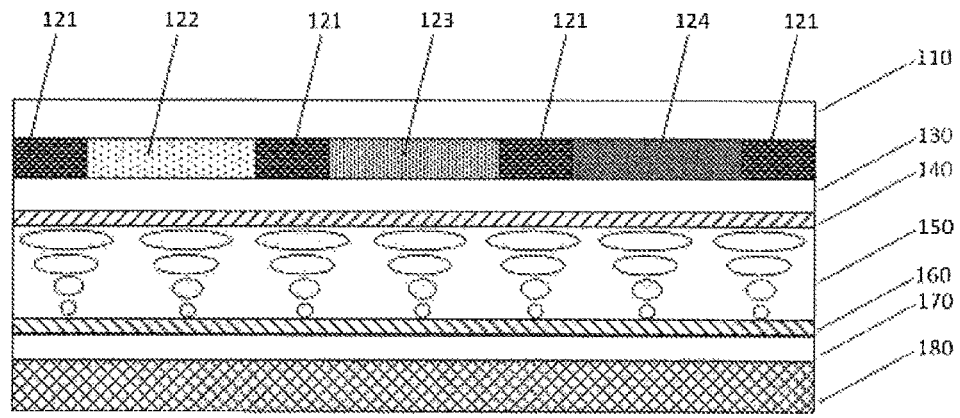
FIG. 1 schematically illustrates a configuration of a conventional reflective liquid crystal panel.
Figure 2:
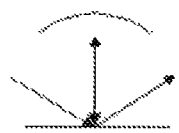
FIG. 2 illustrates a reflected light path diagram of a conventional reflective liquid crystal panel.
Figure 3:
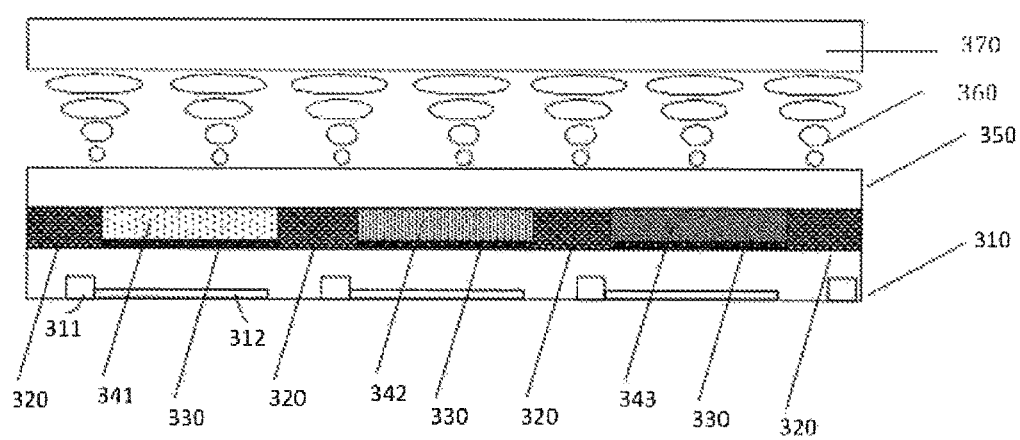
FIG. 3 schematically illustrates a configuration of a liquid crystal panel in accordance with Embodiment 1 of the invention.

FIG. 3 schematically illustrates a configuration of a liquid crystal panel in accordance with Embodiment 1 of the invention. The liquid crystal panel comprises a package substrate 370, a color filter array substrate and a liquid crystal layer 360 filled therebetween. As illustrated in FIG. 3, the color filter array substrate comprises: an array substrate 310 on which a black matrix 320, color filter layers 341-343 and a reflection layer 330 are disposed. Normally, the color filter array substrate has the functions of providing colors and driving pixels.

Herein, the array substrate 310 of the embodiment comprises: a base substrate, on which a gate line, a data line, a TFT 311 and a pixel electrode 312 connected to the TFT 311 are formed. Moreover, array substrate of different display types or design requirements may further comprise for example a common electrode, an alignment layer and the like. The base substrate may be a transparent substrate made of glass, quartz, plastics and the like.

The black matrix 320 comprises a plurality of openings defining sub-pixel regions. The color filter layer and the reflection layer 330 are disposed inside the plurality of openings, and the reflection layer 330 is disposed on a side of the color filter layer that is close to the array substrate 310.

The sub-pixel regions are divided into at least three different types, that is, the red sub-pixel region, the green sub-pixel region and the blue sub-pixel region. Accordingly, the color filter layer is also divided into at least the red color filter layer 341, the green color filter layer 342 and the blue color filter layer 343. That is to say, the red color filter layer 341 is disposed in an upper portion of the red sub-pixel region, the green color filter layer 342 is disposed in an upper portion of the green sub-pixel region, and the blue color filter layer 343 is disposed in an upper portion of the blue sub-pixel region; the reflection layer 330 is disposed in lower portions of all of the red, green and blue sub-pixel regions. Moreover, based on different design requirements, the sub-pixel regions may further comprise a transparent color sub-pixel region, a yellow sub-pixel region and the like; and color filter layers are correspondingly configured when including such sub-pixel regions.

As an example, a thickness of the reflection layer 330 is greater than a half the thickness of the color filter layer and smaller than the thickness of the color filter layer. For example, when the thickness of the color filter layer is 2 μm, the thickness of the reflection layer 330 is between 1 μm and 2 μm.

Moreover, the color filter array substrate may further comprise a flattened layer 350, which is formed on a side of the black matrix 320 and the color filter layer that is far from the array substrate 310 and configured for protecting the black matrix 320 and the color filter layer while flattening the upper surfaces of the black matrix 320 and the color filter layer so as to facilitate subsequent processes to be carried out.

The operating principle of a reflective liquid crystal panel employing the color filter array substrate is as follows:

Ambient light impinges on the liquid crystal layer (not shown in the figure, disposed above the flattened layer 350) from the transparent substrate (not shown in the figure, disposed on the liquid crystal layer and opposed to the color filter array substrate), the pixel electrode 312 on the array substrate 310 generates a pixel voltage, thereby forming an electrical field between the pixel electrode 312 layer and the common electrode layer (not shown in the figure). Driven by the electrical field, the liquid crystal molecules in the liquid crystal layer start to rotate, thereby controlling the transmission of the externally-incident light through the liquid crystal layer. The liquid crystal layer can therefore allow the light to pass or block the light.

When the liquid crystal layer allows the externally-incident light to pass, the light will be incident on the reflection layer 330 and reflected by the reflection layer 330 after passing through the flattened layer 350 and the color filter layer. The light reflected by the reflection layer 330 will pass through the color filter layer, the flattened layer 350, the liquid crystal layer 350, and the transparent substrate. Eventually, the light exits from the reflective liquid crystal panel and get color images displayed.

With the above configuration, the color filter array substrate of the invention interpose the reflection layer in the plurality of openings defining the sub-pixel regions of the black matrix, thereby avoiding the separate disposition of the reflection layer, which can effectively reduce the thickness of the reflective liquid crystal panel.

Embodiment 2

Figure 4:
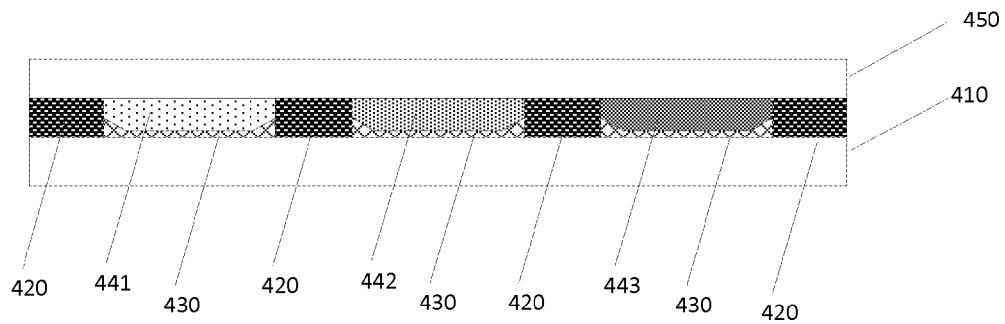
FIG. 4 schematically illustrates a configuration of a color filter array substrate in accordance with Embodiment 2 of the invention.
Figure 5:
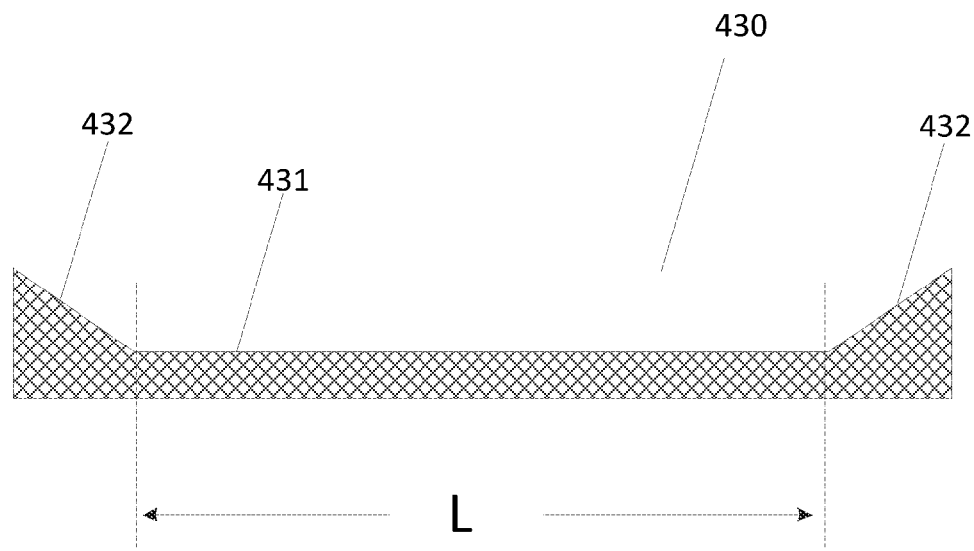
FIG. 5 schematically illustrates a configuration of a reflection layer in accordance with Embodiment 2 of the invention.

FIG. 4 schematically illustrates a configuration of a color filter array substrate in accordance with Embodiment 2 of the invention, and FIG. 5 schematically illustrates a configuration of a reflection layer of Embodiment 2 of the invention. As illustrated in FIGS. 4 and 5, the color filter array substrate of the embodiment is substantially the same as the previous embodiment, with the only difference that, in the embodiment, the surface of a middle portion of the reflection layer 430 that faces the color filter layer is a flat surface 431, whereas the surface of edge portion of the reflection layer 430 that faces the color filter layer and adjacent to the back matrix 420 is an upwardly inclined surface 432.

As a preferred implementation, an inclination angle between the inclined surface 432 and the flat surface 431 is for example in the range from 30 degree to 45 degree.

As another preferred implementation, a width L of the flat surface 431 of the reflection layer 430 is ⅔ to ⅚ of the total width of the reflection layer 430.

Moreover, in the embodiment, a maximum thickness (i.e., the thickness at the apex of the inclined surface 432) of the reflection layer 430 is greater than a half the maximum thickness (i.e., a corresponding thickness at where the lower surface of the color filter layer being a flat surface) of the color filter layer and smaller than the maximum thickness of the color filter layer.

Figure 6:
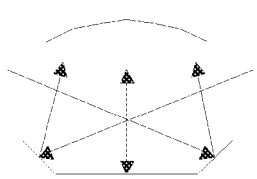
FIG. 6 is a reflected light path diagram of the color filter array substrate in accordance with Embodiment 2 of the invention.

FIG. 6 is a reflected light path diagram of the color filter array substrate in accordance with Embodiment 2 of the invention. As illustrated in FIG. 6, the flat surface 431 at the middle portion of the reflection layer 430 of the embodiment may reflect light incident from the front side of the reflective liquid crystal panel to the frontal active display area. Meanwhile, the inclined surface at the edge portion of the reflection layer 430 may also reflect light incident from both side edges of the reflective liquid crystal panel to the frontal active display area.

For example, when the reflective liquid crystal panel directly faces a light source (such as the Sun or an indoor light bulb), it greatly reflects parallel light which directly impinges on the screen and slightly reflects the diffuse-reflected light from surrounding objects. The parallel light is directly reflected by the flat surface 431 at the middle portion of the reflection layer 430. The diffuse-reflected light comes from various directions, among which those enters the screen from both side edges of the reflective liquid crystal panel can be reflected by the inclined surfaces 432 at the edge portion of the reflection layer 430 and then enters people's field of view, thereby improving the light usage efficiency. When the screen does not face the light source (such as the Sun or an indoor light bulb) directly or the screen's back face the light source, that is, no parallel light directly impinges on the screen, the screen greatly reflects the diffuse-scattered light from the surrounding objects. At this time, both of a portion of the diffuse-reflected light and a portion of the light from the light source that enter the screen from both side edges of the reflective liquid crystal panel can be reflected by the inclined surfaces 432 at the edge portion of the reflection layer 430 and then enters people's field of view, thereby improving the light usage efficiency.

By this means, light incident from both the front side and the side edges of the reflective liquid crystal panel can be almost reflected into people's normal field of view at the frontal active display area, thereby improving the overall light usage efficiency of the reflective liquid crystal panel.

Embodiment 3

Figure 7A:
FIGS. 7a~7e illustrate a flow chart of a fabrication process for a color filter array substrate in accordance with Embodiment 3 of the invention.

FIGS. 7a~7e illustrate a flow chart of a fabrication process for a color filter array substrate in accordance with Embodiment 3 of the invention. With reference to FIGS. 7a~7e, the method for fabricating the color filter array substrate in accordance with the embodiment of the invention comprises steps of:

S100: with reference to FIG. 7a, forming an array substrate 310.

The array substrate comprises for example: a base substrate, on which a gate line, a data line, a TFT (not shown in the figure, refer to the embodiment as illustrated in FIG. 3) and a pixel electrode (not shown in the figure, refer to the embodiment as illustrated in FIG. 3) connected to the TFT are formed. Moreover, array substrates of different display types or design requirements may further comprise for example a common electrode, an alignment layer and the like. The base substrate may be a transparent substrate made of glass, quartz, plastics and the like. The detailed process for fabricating the array substrate 310 can be a conventional method for fabricating an array substrate and will not be elaborated here.

Figure 7B:
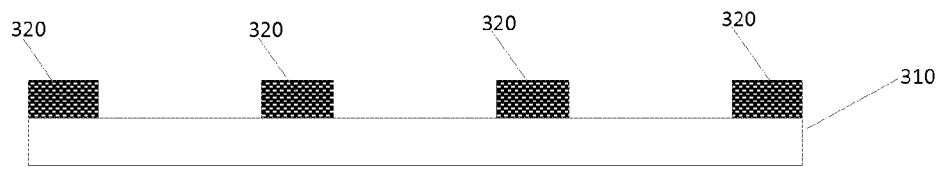

S200: with reference to FIG. 7b, forming a pattern of a black matrix on the array substrate 310, wherein the black matrix comprises a plurality of openings defining sub-pixel regions.

The step may for example comprise: coating a layer of photoresist used for the black matrix on the array substrate 310, exposing and developing by using a mask having patterns to obtain the pattern of the black matrix 320 having the plurality of openings defining the sub-pixel regions. The black matrix may also be fabricated by using a light-blocking metal such as chrome. In this case, it has to coat the photoresist after forming a chrome metal film, because chrome is not photosensitive. Then a mask is used for exposing and developing, followed by etching. Finally the photoresist is peeled to obtain the pattern of the black matrix 320.

S300: forming a pattern of a pattern of a reflection layer and a color filter layer disposed in the plurality of apertures on the array substrate 310, the reflection layer 330 is disposed on a side of the color filter layer that is close to the array substrate 310.

Figure 7C:
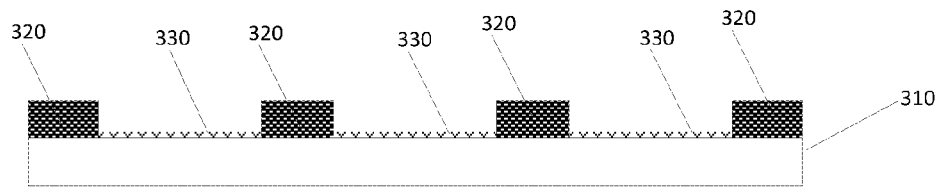

As an example, step S300 may comprise the following steps:

S310: with reference to FIG. 7c, forming the pattern of the reflection layer 330 on the array substrate 310 in the openings.

The step S310 may comprise for example: forming a reflection layer film on the array substrate 310; then coating a photoresist layer on the reflection layer film; next, a mask is used to expose the photoresist to form a photoresist-removed region and a photoresist-retained region, wherein the photoresist-retained region corresponds to the sub-pixel regions, and the photoresist-removed region corresponds to the black matrix region; and then, performing a develop process to retain the photoresist in the photoresist-retained region and remove the photoresist in the photoresist-removed region; etching off the reflection layer film in the photoresist-removed region by using an etching process, to form the pattern of the reflection layer 330; finally, peeling off the remaining photoresist. Herein, the film can be formed by way of deposition, coating, sputtering and the like, which will not be limited here.

Figure 7D:
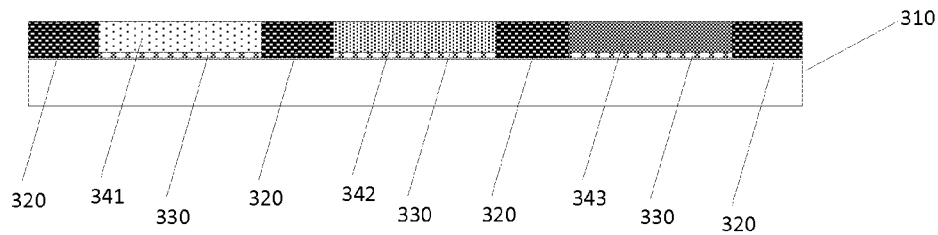

S320: with reference to FIG. 7d, forming a pattern of a color filter layer above the pattern of the reflection layer 330.

In the embodiment, the sub-pixel regions comprise a red sub-pixel region, a green sub-pixel region and a blue sub-pixel region. Forming the pattern of the color filter layer above the pattern of the reflection layer comprises for example:

S321: forming a red color filter layer film above the pattern of the reflection layer in the red sub-pixel region, exposing and developing by using a mask to obtain the red color filter layer 341.

S322: forming a green color filter layer film above the pattern of the reflection layer in the green sub-pixel region, exposing and developing by using a mask to obtain the green color filter layer 342.

S323: forming a blue color filter layer film above the pattern of the reflection layer in the blue sub-pixel region, exposing and developing by using a mask to obtain the blue color filter layer 343.

It is noted that the sequence of fabricating different color filter layers is not subject to any specific limitation and can be determined as needed.

Moreover, the reflection layer film and the color filter layer film may be formed in the openings of the array substrate 310 one after another and then exposed and developed together, then an etching process is performed to obtain the pattern of the reflection layer and the pattern of the color filter layer at the same time.

As an example, a thickness of the reflection layer film is normally greater than a half the thickness of the color filter layer film forming the pattern of the color filer layer film but no larger than the thickness of the color filter layer film. For example, when the thickness of the color filter layer film is 2 μm, the thickness of the reflection layer film is between 1 μm and 2 μm.

Figure 7E:
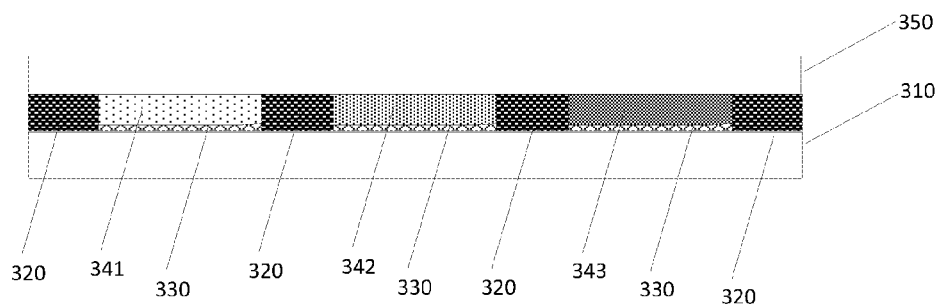

As an example, the method for fabricating the color filter array substrate may further comprise:

S400: with reference to FIG. 7e, forming a flattened layer 350 on a side of the black matrix 320 and the color filter layer that is far from the array substrate 310.

In the embodiment, it is noted that step S200 is not necessarily performed before step S300; instead, it may be performed after step S300 based on actual applications. Specifically, step S200 may be performed after step S310, or after step S320. More specifically, it may be performed after finishing fabricating a color filter layer of any color.

The method of the embodiment may be used to fabricate the color filter array substrate of Embodiment 1. With a color filter array substrate fabricated according to the method, the reflection layer is interposed in the sub-pixel regions between the black matrixes, that is, the reflection layer and the black matrix are disposed in the same layer, thereby avoiding the separate disposition of the reflection layer, which can effectively reduce the thickness of the reflective liquid crystal panel.

Embodiment 4

FIGS. 8a~8e are a flow chart of a fabrication process for a color filter array substrate in accordance with Embodiment 4 of the invention. With reference to FIG. 8a~8e, the method of embodiment is substantially the same as the method in previous embodiment, with the only difference that, in the embodiment, the step of forming the pattern of the reflection layer on the array substrate in the plurality of openings is different from step S310 of the previous embodiment. In the embodiment, the step of forming the pattern of the reflection layer on the array substrate in the plurality of openings comprises: forming a reflection layer film on the array substrate; forming the pattern of the reflection layer by using a half-tone or a gray-tone mask through a patterning process, the surface of a middle portion of the reflection layer that faces the color filter layer is a flat surface, whereas the surface of edge portion of the reflection layer that faces the color filter layer and adjacent to the back matrix is an upwardly inclined surface.

It is noted that the film may be formed by deposition, coating, sputtering and the like, which will not be limited here. Furthermore, a patterning process generally comprises processes of photoresist-coating, exposing, developing, etching, photoresist-peeling and the like. For a film to be patterned, if the material of the film is photosensitive by itself, then photoresist coating and peeling may be omitted during the patterning process. Moreover, the patterning process may further comprise an ashing process as required to form patterns of different thicknesses on the same and one film.

Figure 8A:
FIGS. 8a~8e illustrate a flow chart of a fabrication process for a color filter array substrate in accordance with Embodiment 4 of the invention.
Figure 8B:
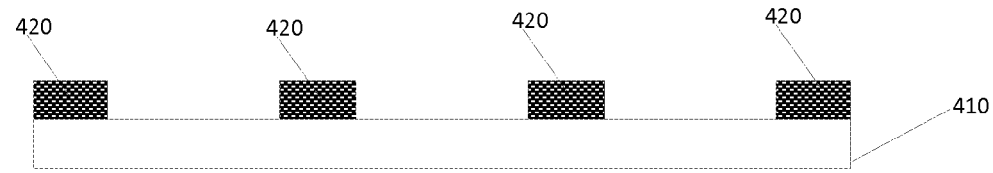
Figure 8C:
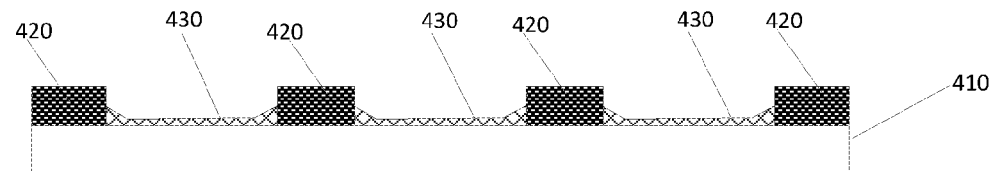
Figure 8D:
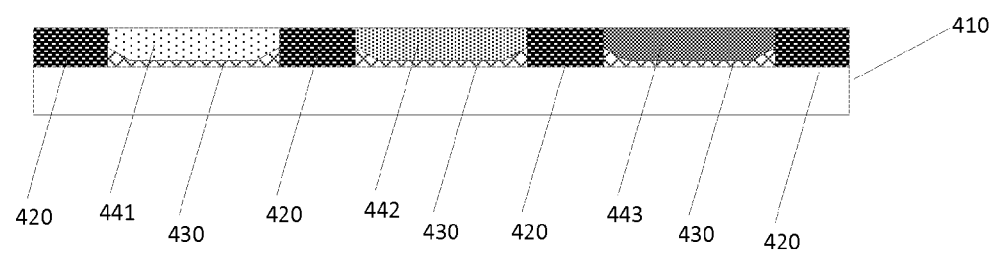
Figure 8E:
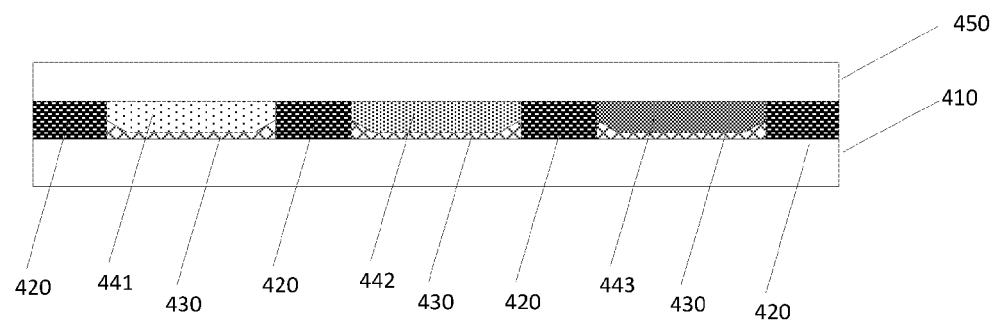

With reference to FIG. 8c, in the embodiment, forming the pattern of the reflection layer on the array substrate in the plurality of openings may for example comprise: forming a layer of reflection layer film on the array substrate 410; then coating a photoresist layer on the reflection layer film; then exposing the photoresist by using a half-tone or a gray-tone mask to form a photoresist-completely-removed region, a photoresist-completely-retained region and a photoresist-partially-retained region, wherein the photoresist-completely-retained region corresponds to the middle portion of the sub-pixel region, the photoresist-partially-retained region corresponds to the edge portion adjacent to the black matrix of the sub-pixel region, and the photoresist-completely-removed region corresponds to the black matrix region; performing a develop process such that the photoresist in the photoresist-completely-retained remains the same, the thickness of the photoresist-partially-retained region is reduced and the photoresist in the photoresist-completely-removed region is completely removed; and then, completely etching away the reflection layer film in the photoresist-completely-removed region by using a first etching process; removing the photoresist in the photoresist-partially retained region by using an ashing process to expose the reflection layer film in that region; and then etching away the reflection layer film in the photoresist-partially-retained region by using a second etching process to form the pattern of the reflection layer 430; finally, peeling off the remaining photoresist. Herein, the surface of a middle portion of the resultant reflection layer 430 that faces the color filter layer is a flat surface, whereas the surface of edge portion of the reflection layer 430 that faces the color filter layer and adjacent to the back matrix 420 is an upwardly inclined surface.

The detailed method for forming the pattern of the color filter layer (at least comprising a red color filter layer 441, a green color filter layer 442 and a blue color filter layer 443)

above the pattern of the reflection layer 430 is the same as that of Embodiment 3 and will not be elaborated here.

As an example, the method for fabricating the color filter array substrate may further comprise the step of:

forming a flattened layer 450 on a side of the black matrix 420 and the color filter layer that is far from the array substrate 410, with reference to 8e.

The method of the embodiment may be used to fabricate the color filter array substrate of Embodiment 2. When the color filter array substrate fabricated by the method is applied to the reflective liquid crystal panel, all light incident from both the front side and the side edges of the reflective liquid crystal panel can be substantially reflected into people's normal field of view at the frontal active display area, thereby improving the overall light usage efficiency of the reflective liquid crystal panel.

Embodiment 5

The embodiment of the invention further provides a display device comprising the color filter array substrate of Embodiment 1 or 2. The display device may be a liquid crystal panel, a mobile phone, a tablet PC, a television, a display device, a notebook, a digital photoframe, a navigator and any product or component having a display function.

By using the above color filter array substrate, the display device of the embodiment is thinner and narrower, making the overall volume smaller. Meanwhile, when the color filter array substrate of Embodiment 2 is used, it can substantially reflect all light incident from both the front side and the side edges of the display device into people's normal field of view at the frontal active display area, improving the overall light usage efficiency of the reflective liquid crystal panel, which is beneficial to the operation of the display device under a dim environment.

According to the color filter array substrate, the method for fabricating the same and the display device provided by the embodiments of the invention, the reflection layer is interposed in the sub-pixel regions between the black matrixes, that is, the reflection layer and the black matrix are disposed in the same layer, thereby avoiding the separate disposition of the reflection layer, which may effectively reduce the thickness of the reflective liquid crystal panel and the display device and is beneficial for designing thin and narrow reflective liquid crystal panel and display device. Meanwhile, the surface of the middle portion of the reflection layer that faces the color filter layer is designed as a flat surface, and the surface of the edge portion of the reflection layer that faces the color filter layer and is adjacent to the back matrix is designed as an upwardly inclined surface, which makes it possible to reflect all light incident from both the front side and the side edges of the reflective liquid crystal panel and the display device into people's normal field of view at the frontal active display area, thereby improving the overall light usage efficiency of the reflective liquid crystal panel and the display device.

What are described above is related to the illustrative embodiments of the disclosure only and not limitative to the scope of the disclosure; the scopes of the disclosure are defined by the accompanying claims.

What is claimed is:

1. A color filter array substrate for a reflective type liquid crystal display panel, comprising an array substrate and a black matrix, a color filter layer and a reflection layer formed on the array substrate; wherein, the black matrix comprises a plurality of openings defining sub-pixel regions;

the color filter layer and the reflection layer are disposed in the plurality of openings and the reflection layer is disposed on a side of the color filter layer that is close to the array substrate;

the reflection layer is only disposed in the plurality of openings of the black matrix and completely covers the plurality of openings of the black matrix;

the reflection layer is a continuous structure, and an orthographic projection of the reflection layer on the array substrate does not overlapped with an orthographic projection of the black matrix on the array substrate;

the array substrate comprises: a base substrate, and a thin film transistor (TFT) and a pixel electrode connected to the TFT that are provided on the base substrate;

the black matrix further comprises a plurality of black matrix units arranged along a first direction, and the color filter layer comprises a plurality of color filters arranged along the first direction; and a width of the reflection layer in the first direction is equal to a distance between orthographic projections of edges, which are in direct contact with edges of the reflection layer, of two black matrix units on the array substrate, and the width of the reflection layer in the first direction is further equal to a width of a color filter, which is in direct contact with the reflection layer, in the first direction.

2. The color filter array substrate of claim 1, wherein the surface of a middle portion of the reflection layer that faces the color filter layer is a flat surface, the surface of edge portion of the reflection layer that faces the color filter layer and is adjacent to the back matrix is an upwardly inclined surface.

3. The color filter array substrate of claim 2, wherein an inclination angle between the inclined surface and the flat surface ranges from 30 degree to 45 degree.

4. The color filter array substrate of claim 3, further comprising a flattened layer formed on a side of the black matrix and the color filter layer that is far from the array substrate.

5. The color filter array substrate of claim 2, wherein a maximum thickness of the reflection layer is greater than a half of a maximum thickness of the color filter layer and smaller than the maximum thickness of the color filter layer.

6. The color filter array substrate of claim 5, further comprising a flattened layer formed on a side of the black matrix and the color filter layer that is far from the array substrate.

7. The color filter array substrate of claim 2, wherein a width of the flat surface of the reflection layer is ⅔ to ⅚ of a total width of the reflection layer.

8. The color filter array substrate of claim 2, further comprising a flattened layer formed on a side of the black matrix and the color filter layer that is far from the array substrate.

9. The color filter array substrate of claim 2, wherein the reflection layer is contained in each of the plurality of openings defining the sub-pixel regions of the black matrix, and lateral sides of the reflection layer in each of the plurality of openings abut lateral sides of the black matrix.

10. The color filter array substrate of claim 1, further comprising a flattened layer formed on a side of the black matrix and the color filter layer that is far from the array substrate.

11. A display device comprising the color filter array substrate of claim 1.

12. The display device of claim 11, wherein the surface of a middle portion of the reflection layer that faces the color filter layer is a flat surface, the surface of edge portion of the reflection layer that faces the color filter layer and is adjacent to the back matrix is an upwardly inclined surface.

13. The display device of claim 12, wherein an inclination angle between the inclined surface and the flat surface ranges from 30 degree to 45 degree.

14. The display device of claim 12, wherein a maximum thickness of the reflection layer is greater than a half of a maximum thickness of the color filter layer and smaller than the maximum thickness of the color filter layer.

15. The display device of claim 12, wherein a width of the flat surface of the reflection layer is ⅔ to ⅚ of a total width of the reflection layer.

16. The display device of claim 11, wherein the color filter array substrate further comprising a flattened layer formed on a side of the black matrix and the color filter layer that is far from the array substrate.

17. A method for fabricating a color filter array substrate for a reflective type liquid crystal display panel comprising:
   forming an array substrate;
   forming a pattern of a black matrix on the array substrate, wherein the black matrix comprises a plurality of openings defining sub-pixel regions; and
   forming a pattern of a color filter layer and a pattern of a reflection layer in the plurality of openings on the array substrate, the reflection layer is disposed on a side of the color filter layer that is close to the array substrate;
   wherein
   the reflection layer is only disposed in the plurality of openings of the black matrix and completely covers the plurality of openings of the black matrix;
   the reflection layer is a continuous structure, and an orthographic projection of the reflection layer on the array substrate does not overlapped with an orthographic projection of the black matrix on the array substrate;
   the array substrate comprises: a base substrate, and a thin film transistor (TFT) and a pixel electrode connected to the TFT that are provided on the base substrate;
   the black matrix further comprises a plurality of black matrix units arranged along a first direction, and the color filter layer comprises a plurality of color filters arranged along the first direction; and
   a width of the reflection layer in the first direction is equal to a distance between orthographic projections of edges, which are in direct contact with edges of the reflection layer, of two black matrix units on the array substrate, and the width of the reflection layer in the first direction is further equal to a width of a color filter, which is in direct contact with the reflection layer, in the first direction.

18. The method of claim 17, wherein the step of forming a pattern of a black matrix on the array substrate, wherein the black matrix comprises a plurality of openings defining sub-pixel regions comprises:
   forming a reflection layer film on the array substrate;
   forming the pattern of the reflection layer by using a half-tone or a gray-tone mask through a patterning process, the surface of a middle portion of the reflection layer that faces the color filter layer is a flat surface, the surface of edge portion of the reflection layer that faces the color filter layer and is adjacent to the back matrix is an upwardly inclined surface.

19. The method of claim 17, further comprising:
   forming a flattened layer on a side of the black matrix and the color filter layer that is far from the array substrate.

20. A color filter array substrate for a reflective type liquid crystal display panel, comprising an array substrate and a black matrix, a color filter layer and a reflection layer formed on the array substrate; wherein,
   the black matrix comprises a plurality of openings defining sub-pixel regions;
   the color filter layer and the reflection layer are disposed in the plurality of openings and the reflection layer is disposed on a side of the color filter layer that is close to the array substrate;
   the reflection layer is only disposed in the plurality of openings of the black matrix and completely covers the plurality of openings of the black matrix;
   the reflection layer comprises a flat portion located in a middle region of the reflection layer, and an inclined portion located in an edge region of the reflection layer, a thickness of the inclined portion is larger than a thickness of the flat portion;
   the black matrix further comprises a plurality of black matrix units arranged along a first direction, and the color filter layer comprises a plurality of color filters arranged along the first direction; and
   a width of the reflection layer in the first direction is equal to a distance between orthographic projections of edges, which are in direct contact with edges of the reflection layer, of two black matrix units on the array substrate, and the width of the reflection layer in the first direction is further equal to a width of a color filter, which is in direct contact with the reflection layer, in the first direction.

* * * * *